United States Patent Office

2,900,298
Patented Aug. 18, 1959

2,900,298

METHOD OF INHIBITING FUNGUS GROWTH COMPRISING THE APPLICATION OF THE REACTION PRODUCT OF A MONO-OLEFINIC ALDEHYDE AND AROMATIC HYDRAZINE

Ernest G. Jaworski, Florissant, Mo., and Van R. Gaertner, Dayton, Ohio, assignors to Monsanto Chemical Company, St. Louis, Mo., a corporation of Delaware No Drawing. Application June 10, 1957
Serial No. 664,482

8 Claims. (Cl. 167—30)

This invention relates to new and useful methods for treating living plants which are subject to attack by fungi, and is particularly concerned with eradicants for cereal rusts, especially wheat rust.

We have found that unusually effective fungicidal compositions are obtained when the active ingredient is the reaction product of an $\alpha,\beta$-mono-olefinic aldehyde selected from the class consisting of alkenals and aryl-substituted alkenals having from 3 to 14 carbon atoms and a substituted hydrazine of the formula

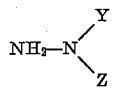

in which Y is a benzenoid hydrocarbon of from 6 to 12 carbon atoms and Z is selected from the class consisting of Y, hydrogen and an alkyl radical of from 1 to 12 carbon atoms.

The presently useful aldehyde-substituted hydrazine condensation products are readily obtainable by contacting the $\alpha,\beta$-mono-olefinic aldehyde with the substituted hydrazine at ordinary, increased or decreased temperatures and in the presence or absence of an inert diluent or solvent. Whereas saturated aldehydes are known to condense with the hydrazines, generally, to give only stable hydrazones, the $\alpha,\beta$-olefinic aldehydes undergo condensation with the hydrocarbon-substituted hydrazines to give a complex mixture of reaction products, some of which have been heretofore unidentifiable. Thus, while E. Tischer et al., Ann. 239, 196 (1887), and von Auwers et al., Berichte, 58, 1974 (1925), report that the condensation of acrolein with phenylhydrazine in ether gives about a 22 percent yield of 1-phenylpyrazoline, a possible cyclization product of acrolein phenylhydrazone, the presence of acrolein phenylhydrazone in the residual reaction mixture has been reported by these investigators only on the basis of detection of phenylhydrazine qualitatively after alkaline hydrolysis. The prior art did not report, and we have not been able to ascertain, either the identity of the hydrolysis product or the nature of its precursor. However, we have found by cryoscopic molecular weight determination that the molecular weight of the acrolein-phenylhydrazine reaction product is too high to allow for any considerable content of acrolein phenylhydrazone. Thus, whereas the molecular weight of acrolein phenylhydrazone or of 1-phenylpyrazoline is 146.20, the molecular weight of the total acrolein-phenylhydrazine reaction product is 253. In view of the fact that up to 22 percent of 1-phenylpyrazoline may be present in the crude reaction mixture, the residue may consist of dimeric products or of even higher polymers. Hence, if monomeric acrolein phenylhydrazone is a constituent of the crude reaction product, it can be present only in very minor proportion. In any event, its presence has not been confirmed. Since, as will be shown hereinafter, 1-phenylpyrazoline demonstrates no activity against wheat-rust fungus whereas the crude acrolein-phenylhydrazine reaction product is extremely effective against the organism, it is apparent that the fungi-inhibiting agent in the crude product is a constituent other than said pyrazoline compound. Inasmuch as the effective constituent is extremely active, the 1-phenylpyrazoline need not be removed from the crude acrolein-phenylhydrazine reaction mixture prior to its use for fungicidal purposes, the pyrazoline content of the crude reaction mixture thus serving merely as an inert carrier of the active principle.

While the above discussion of $\alpha,\beta$-olefinic aldehyde-hydrocarbon-substituted hydrazine reaction mixtures has been limited to that obtained from acrolein and phenylhydrazine, so far as I have been able to ascertain, mixtures of compounds are generally obtained when the other $\alpha,\beta$-olefinic aldehydes are contacted with the hydrocarbon-substituted hydrazine. Although the pyrazoline content of the mixtures varies with the nature of the individual aldehyde, the pyrazoline compound is not the only constituent of the reaction mixture, there, being formed in each instance a mixture which contains the fungicidally active constituent. Because, apparently irrespective of reaction conditions employed, a mixture comprising some fungicidally active, unidentifiable material is obtained from the hydrocarbon-substituted hydrazine and $\alpha,\beta$-alkenals or $\alpha,\beta$-arylalkenals, generally, the presently useful fungicides can be defined only as reaction products.

Hydrazine compounds employed for the preparation of the presently useful condensates have the formula

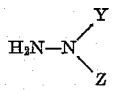

in which Y and Z are as above defined. This includes hydrazines having an aryl or alkaryl radical of up to 12 carbon atoms attached to one nitrogen atom and either hydrogen or a hydrocarbon radical free of non-benzenoid unsaturation attached to the same nitrogen atom, e.g., phenylhydrazine, p-tolylhydrazine, 2,4-dimethylphenylhydrazine or 2-hexylphenylhydrazine and the 1-benzenoid or the 1-alkyl derivatives thereof such a 1-methyl-1-phenylhydrazine, 1-isoamyl-1-phenylhydrazine, 1-dodecyl-1-o-tolylhydrazine, 1-(4-ethylphenyl)-1-phenylhydrazine, 1,1-diphenylhydrazine, etc. In the useful hydrazines, there may be only one hydrocarbon radical attached to one of the nitrogen atoms or there may be two of the same hydrocarbon radicals or two dissimilar hydrocarbon radicals attached to one nitrogen atom. Because of the easy availability of phenylhydrazine, the condensation products of this particular hydrazine derivative and the $\alpha,\beta$-olefinic aldehydes are advantageously used in the preparation of the present fungicidal compositions.

Examples of olefinic aldehydes used in preparing the presently employed reaction mixtures are acrolein, methacrolein and other $\alpha$-substituted acroleins such as an $\alpha$-propylacrolein or atropic aldehyde; crotonaldehyde; tiglic aldehyde; 2,3-dimethyl-2-butenal; 2-ethyl-2-hexenal; 2-decenal; 2-dodecenal; 2-methyl-2-pentenealdehyde; 2-tetradecenal; cinnamaldehyde; $\alpha$-methylcinnamaldehyde; $\alpha$-amylcinnamaldehyde; 4-methylcinnamaldehyde; $\gamma$-benzylcrotonaldehyde; 2-ethyl-2-phenylbutenal; etc.

Examples of the presently useful reaction products include the reaction products of phenylhydrazine, 4-tolylhydrazine, 1-methyl-1-phenylhydrazine or 1,1-diphenylhydrazine with either acrolein, crotonaldehyde, $\alpha$-methylcrotonaldehyde, 2-(2-phenethyl)acrolein, cinnamaldehyde, $\beta$-methylcinnamaldehyde, and 2-dodecenal.

We have discovered that the $\alpha,\beta$-olefinic aldehyde hydrocarbon hydrazine reaction products herein defined are highly efficient for preventing and retarding fungus growth on living plants, generally. They may be applied directly to the plants which are to be treated, but because the present aldehyde-hydrazine reaction products are effective in extremely dilute concentrations, it is preferred to incorporate them with a carrier or diluent.

Fungicidal dusts may be prepared by mixing the reaction products with dusting materials such as talc, clay, lime, bentonite, pumice, fuller's earth, etc. The olefinic aldehyde-hydrocarbon-substituted reaction products may be dissolved in organic solvents therefor and the resulting solutions used as fungicidal or fungi-preventing sprays. More expediently a small amount of concentrated solution of the olefinic aldehyde-substituted hydrazine reaction products in an organic solvent, e. g., cyclohexanone, may be added to water in the presence of an emulsifying agent to form an emulsion and the oil-in-water emulsion thus obtained is employed as a spray. Suspensions or dispersions of said reaction products in a solvent such as water may be employed, but the emulsions are particularly useful in that they adhere more efficiently to the plants which are being treated.

The presently employed reaction products are particularly valuable in the control of cereal rusts, whereby they function as plant chemotherapeutants against the various leaf and stem rusts of wheat, barley, rye, and oats and other small grain crop plants. Such cereal rusts as the stem rust *Puccinia graminis tritici*, or the leaf rust *P. rubigo-vera tritici* or the stripe rust *P. glumarum* of wheat usually cannot be controlled by general purpose fungicides. The stem and crown rusts of oats (*P. graminis avenae* and *P. coronata avenae*), as well as the stem rust of rye (*P. graminis secalis*) or the leaf rust (*P. hordei*) of barley display similar resistance.

In prior art, much effort has been expended in the past in breeding rust-resistant strains of these cereals; but as new strains of, e.g., wheat, are developed, new races of the above classes of rusts appear and proceed to attack the new, presumably rust-resistant strains of wheat. The history of breeding for rust resistance thus comprises a recurrent introduction of cereal strains which are resistant to prevailing races of the rusts and subsequent appearance of new races of rusts to which the recently introduced cereal strains are susceptible. Accordingly, the eradication of fungus growth by chemical treatment of cereal plants has become subjected to close scrutiny. Unfortunately most of the known fungicides have been found to be unsuitable either because they do not prevent or destroy rust growth at non-phytotoxic concentrations or because their physical and chemical nature prevents a commercially expedient means of application. Particularly when aerial dusting or spraying is the contemplated means of application, particle size and solubility are of extreme importance.

The invention is further illustrated, but not limited, by the following examples:

Example 1

An acrolein-phenylhydrazine reaction product was prepared by gradually adding phenylhydrazine to a substantially equimolar quantity of acrolein at initially ordinary room temperature. During the addition, the exothermic temperature of the reaction mixture was maintained at below about 50° C. When all of the phenylhydrazine had been added, the whole was gently heated under a pressure of about 1 mm. of mercury whereby a portion of the calculated quantity of by-product water was removed.

The therapeutic effect of the resulting reaction mixture was determined by the following procedure:

Five uniform, six-day old seedlings of a rust-susceptible variety of wheat (Seneca) were sprayed with water by means of an atomizer. The individual leaves were then gently rubbed between the thumb and index finger to remove the "bloom," and then inoculated with *Puccinia rubigo-vera tritici* by gently scraping, up and down the back sides of the rubbed leaves, a scalpel which had been water-wetted and loaded with spores of the organism. Following inoculation, the plants were sprayed with a fine mist of water and maintained for 48 hours in an incubation chamber at a temperature of 70° F. and a humidity of 100%. They were then transferred to greenhouse benches where they were kept for another 48 hours. At the end of that time they were sprayed with an emulsion prepared as follows:

The acrolein-phenylhydrazine reaction product (100 mg.), was added to 5 ml. of acetone, and there was then introduced to the resulting solution approximately 0.1 ml. of an emulsifying agent known to the trade as "Tween 20" and reputed to be a polyoxyethylene sorbitan monolaurate. The whole was then diluted with 5 ml. of water to give an emulsion containing 1% by weight of the acrolein-phenylhydrazine reaction product. For the instant test the 1% emulsion was further diluted with water to give respective emulsions containing concentrations of 0.5% by weight or 0.1% by weight of the test reaction product.

Spraying of the plants with the emulsions was effected by means of an atomizer, 5 ml. of each emulsion being used per pot (five plants/pot) respectively. The sprayed plants were then returned to the greenhouse and held there for a week. Observation of the plants at the end of that time disclosed that the plants which had been sprayed with either the 0.5% or the 0.1% emulsion of the acrolein-phenylhydrazine reaction product were entirely free of rust pustules. No evidence of any phytotoxic effect of the emulsions on the sprayed plants was observed. Similarly inoculated but unsprayed plants which had been maintained in the incubator and greenhouse for the same length of time were found to be badly affected by the rust.

Example 2

An acrolein-phenylhydrazine reaction product was prepared on a larger scale as follows:

To a 30-gallon, jacketed, glass-lined reactor equipped with a turbine-type agitator driven at 93 r.p.m. there were charged 100 lbs. of benzene and 57.3 lbs. of phenylhydrazine. Acrolein (a total of 32.7 lbs.) was gradually fed into the reactor at such a rate as to maintain the temperature of the reaction mixture at 40° C. When all of the acrolein had been introduced, the temperature of the reaction mixture was increased to 50° C. by external heating while acrolein (about 3.0 lbs.) was removed via a steam ejector at a pressure of 200 mm. of mercury. Water and benzene were then removed at the same pressure and temperature. When benzene and water removal had been completed, the system pressure was reduced to full water jet vacuum and the reaction mixture was maintained at 50° C. under full vacuum for four hours.

When the resulting reaction mixture, hereinafter referred to as the product, was evaluated for activity against wheat rust as in Example 1, it was found to have the wheat rust inhibiting efficiency of the acrolein-phenylhydrazine reaction product of that example.

A study of the product of the present example was conducted in an attempt to determine its composition and the nature of its fungicidally active constituent. Cryoscopic molecular weight determination of the product gave a value of 253. Since the molecular weight of acrolein phenylhydrazone as well as of 1-phenylpyrazoline is 146.20, the product must contain a predominance of other material. Spectral studies of the product showed the N—H linkage to be present. Steam distillation of the product gave only 9.0% of substantially pure 1-phenylpyrazoline which was found to have a molecular weight of 143 by the cryoscopic method used for determining the molecular weight of the product.

A purified sample of 1-phenylpyrazoline was then prepared and tested against wheat rust as in Example 1. It was found to have no activity against the organism, the inoculated wheat being as badly affected by the fungus as that which had been inoculated and treated with nothing.

When the residue obtained after steam-distilling off the 1-phenylpyrazoline was tested against wheat rust as in Example 1, it was fully as effective as the acrolein-phenylhydrazine reaction product of Example 1.

Example 3

An acrolein-phenylhydrazine reaction product prepared by adding phenylhydrazine to acrolein in substantially equimolar proportions while maintaining the temperature of the reaction mixture at about 0° C. was prepared. When the resulting reaction mixture was tested against wheat rust as in Example 1, an 0.5 percent emulsion thereof was found to inhibit the rust.

Example 4

An acrolein-phenylhydrazine reaction product was prepared as in the above example, except that the temperature of the reaction mixture was carried from room temperature to 100° C. Testing of the resulting reaction product by the procedure of Example 1 showed it to completely inhibit wheat rust at an 0.5 percent concentration.

Example 5

An acrolein-phenylhydrazine reaction product was prepared as in Example 1, except that the water-removal step was omitted. Testing of the resulting reaction mixture showed it to be fully equivalent to the reaction product of Example 1 with respect to wheat rust inhibiting property.

Example 6

For purposes of comparison, reaction products were prepared from acrolein and either phenylhydrazine, 2,4-dinitrophenylhydrazine, or 4-hydroxyphenylhydrazine, the products in each case being prepared by adding the appropriate hydrazine to the acrolein in equimolar quantities while maintaining the exothermic reaction at below 40° C. When the resulting crude reaction products were tested for efficiency against wheat rust as in Example 1, it was found that at an 0.5 percent concentration the acrolein-phenylhydrazine reaction product completely inhibited the wheat rust, whereas the acrolein-2,4-dinitrophenylhydrazine reaction product and the acrolein-4-hydroxyphenylhydrazine reaction product were totally ineffective.

Example 7

A reaction product was prepared by adding acrolein to 1-methyl-1-phenylhydrazine in ether solution and subsequently removing the solvent. The resulting reaction product was found to completely inhibit wheat rust when tested at an 0.5 percent concentration by the method of Example 1.

Example 8

In this example there was tested the wheat rust eradicating efficiency of a crotonaldehyde-phenylhydrazine reaction product prepared by adding phenylhydrazine to a substantially equimolar quantity of crotonaldehyde substantially as described in Example 1. Employing the testing procedure of Example 1, substantial suppression of the wheat rust was observed with plants which had been sprayed with an 0.5% emulsion of the crotonaldehyde-phenylhydrazine reaction product, and there was no evidence of any phytotoxic effect of said emulsion.

Example 9

A reaction product, obtained by condensing cinnamaldehyde with phenylhydrazine substantially as described in Example 1 for preparation of the acrolein reaction product, was tested against wheat rust as in Example 1. At an 0.5% concentration complete inhibition of the rust on the inoculated and sprayed plants was observed.

This application is a continuation-in-part of application Serial No. 457,557, filed September 21, 1954, now abandoned.

What we claim is:

1. The method of inhibiting fungus growth on living plants which comprises applying to the plants a fungus-inhibiting quantity of the reaction product of a mono-olefinic aldehyde selected from the class consisting of $\alpha,\beta$-alkenals and aryl-substituted $\alpha,\beta$-alkenals having from 3 to 14 carbon atoms, and a substituted hydrazine of the formula

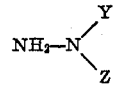

in which Y is a benzenoid hydrocarbon of from 6 to 12 carbon atoms and Z is selected from the class consisting of Y, hydrogen and an alkyl radical of from 1 to 12 carbon atoms.

2. The method of inhibiting fungus growth on living plants which comprises applying to the plants a fungus-inhibiting quantity of the reaction product of an $\alpha,\beta$-alkenal of from 3 to 14 carbon atoms and phenylhydrazine.

3. The method of inhibiting the development of rust on wheat plants which comprises applying to the plants a rust-inhibiting quantity of the reaction product of a mono-olefinic aldehyde selected from the class consisting of $\alpha,\beta$-alkenals and aryl-substituted $\alpha,\beta$-alkenals having from 3 to 14 carbon atoms, and a substituted hydrazine of the formula

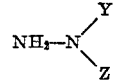

in which Y is a benzenoid hydrocarbon of from 6 to 12 carbon atoms and Z is selected from the class consisting of Y, hydrogen and an alkyl radical of from 1 to 12 carbon atoms.

4. The method of inhibiting the development of rust on wheat plants which comprises applying to the plants a rust-inhibiting quantity of the reaction product of phenylhydrazine and a mono-olefinic aldehyde selected from the class consisting of $\alpha,\beta$-alkenals and $\alpha,\beta$-aryl-substituted alkenals having from 3 to 14 carbon atoms.

5. The method of inhibiting the development of rust on wheat plants which comprises applying to the plants a rust-inhibiting quantity of the reaction product of phenylhydrazine and $\alpha,\beta$-alkenal of from 3 to 14 carbon atoms.

6. The method of inhibiting the development of rust on wheat plants which comprises applying to the plants a rust-inhibiting quantity of the reaction product of phenylhydrazine and acrolein.

7. The method of inhibiting the development of rust on wheat plants which comprises applying to the plants a rust-inhibiting quantity of the reaction product of phenylhydrazine and crotonaldehyde.

8. The method of inhibiting the development of rust on wheat plants which comprises applying to the plants a rust-inhibiting quantity of the reaction product of phenylhydrazine and cinnamaldehyde.

References Cited in the file of this patent

UNITED STATES PATENTS 2,054,062    Bonrath et al. _____ Sept. 15, 1936